United States Patent
Cochran et al.

[19]

[11] Patent Number: 6,109,126
[45] Date of Patent: Aug. 29, 2000

[54] SHIFT CONTROL SYSTEM FOR AN AUXILIARY SECTION OF A COMPOUND VEHICULAR TRANSMISSION

[75] Inventors: Stephen C. Cochran, Sylvania; James L. Holman, Wauseon, both of Ohio

[73] Assignee: Transmission Technologies Corporation, Farmington Hills, Mich.

[21] Appl. No.: 09/085,419

[22] Filed: May 27, 1998

[51] Int. Cl.[7] ............................. F16H 59/12; F16H 59/40
[52] U.S. Cl. ......................................... 74/336 R; 477/908
[58] Field of Search ................................ 74/335, 336 R, 74/745; 477/125, 908

[56] References Cited

U.S. PATENT DOCUMENTS

| | | | |
|---|---|---|---|
| 3,939,722 | 2/1976 | Stromberg | 74/336 R |
| 4,570,765 | 2/1986 | Makita . | |
| 4,722,248 | 2/1988 | Braun . | |
| 4,850,236 | 7/1989 | Braun | 74/337 |
| 5,089,965 | 2/1992 | Braun | 477/125 X |
| 5,105,675 | 4/1992 | Langford et al. | 74/335 |
| 5,172,603 | 12/1992 | MacInnis | 74/335 |
| 5,224,392 | 7/1993 | Hutchison et al. | 74/336 R X |
| 5,263,379 | 11/1993 | Newbigging et al. | 74/336 R |
| 5,329,826 | 7/1994 | Grave, Jr. et al. | 74/335 |
| 5,413,542 | 5/1995 | Jarvis | 477/84 |
| 5,487,004 | 1/1996 | Amsallen . | |
| 5,569,115 | 10/1996 | Desautels et al. | 477/110 |
| 5,571,059 | 11/1996 | Desautels et al. | 477/111 |
| 5,573,477 | 11/1996 | Desautels et al. | 477/109 |
| 5,582,558 | 12/1996 | Palmeri et al. | 477/109 |
| 5,592,851 | 1/1997 | Bates et al. | 74/336 R |
| 5,673,592 | 10/1997 | Huggins et al. | 74/336 R |

*Primary Examiner*—Sherry L. Estremsky
*Attorney, Agent, or Firm*—MacMillan, Sobanski & Todd, LLC

[57] ABSTRACT

A method and apparatus for operating a compound transmission automatically prevents a manually selected shift of the auxiliary section from occurring unless the vehicle speed is within a predetermined maximum limit or range. A shift controller initially determines if a request for a shift operation in the auxiliary section has been made by the operator of the vehicle. This determination may be inferred from a change in the position of a manually operable switch. If a shift request has been made, the shift controller determines if the main section of the transmission is in the neutral gear ratio. If the main section of the transmission is not in the neutral gear ratio, then the shift controller takes no further action. When the shift controller determines that the main section of the transmission is in the neutral gear ratio, then it determines if the speed of the vehicle is within a predetermined limit or range to enable shifting of the auxiliary section in a safe and efficient manner. If the vehicle speed is not within the predetermined limit or range, then the shift controller takes no further action. If, however, the vehicle speed is within the predetermined limit or range, the shift controller activates a shift actuator to effect the desired shift within the auxiliary section of the transmission.

11 Claims, 2 Drawing Sheets

SHIFT CONTROL SYSTEM FOR AN AUXILIARY SECTION OF A COMPOUND VEHICULAR TRANSMISSION

BACKGROUND OF THE INVENTION

This invention relates in general to vehicle transmissions and in particular to a method and apparatus for automatically controlling the operation of an auxiliary section of a compound transmission.

In virtually all land vehicles in use today, a transmission is provided in a drive train between a source of rotational power, such as an internal combustion or diesel engine, and the driven axle and wheels of the vehicle. A typical transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

A compound transmission is a transmission that is divided into two or more separate sections, each of which provides a plurality of gear ratios. Typically, a compound transmission is divided into two sections, namely, a main section that provides a first plurality of gear ratios and an auxiliary section that provides a second plurality of gear ratios. The total number of gear ratios available from the compound transmission as a whole is equal to the product of the number of gear ratios available from the main section and the number of gear ratios available from the auxiliary section. Thus, if the main section provides four gear ratios and the auxiliary section provides two gear ratios, the compound transmission as a whole can provide a total of eight gear ratios.

The auxiliary sections of compound transmissions can be divided into two general types, namely, range type and splitter type. In a range type of compound transmission, the differences between the adjacent gear ratios provided by the auxiliary section are greater than the differences between the adjacent gear ratios provided by the main section. Thus, to shift sequentially upwardly through the available gear ratios, the main section is initially shifted through all of its gear ratios while the range section is maintained in a first gear ratio, then the range section is shifted into a second gear ratio before re-shifting through all of the gear ratios of the main section. In a splitter type of compound transmission, the differences between the adjacent gear ratios provided by the auxiliary section are less than the differences between the adjacent gear ratios provided by the main section. Thus, to shift sequentially upwardly through the available gear ratios, the main section is maintained in a first gear ratios while the splitter section is initially shifted through all of its gear ratios, then the main section is shifted into a second gear ratio before re-shifting through all of the gear ratios of the splitter section.

Many transmission structures are known in the art for performing these gear ratio selections manually, i.e., in response to some physical exertion by the driver of the vehicle. In a conventional manual transmission, the driver grasps and moves an upper portion of a pivotable shift lever to effect shifting of the main section of the compound transmission. In response thereto, a lower portion of the shift lever is moved within the main section of the compound transmission to select the desired gear ratio therein. To control the operation of the auxiliary section, it is known to provide a thumb switch on the upper end of the shift lever. The thumb switch is manually moved by the driver when it is desired to select a gear ratio for the auxiliary section. Movement of the thumb switch activates a pneumatic actuator to effect the desired shifting of the auxiliary section. Manually operated transmissions of this general type are well known in the art and are relatively simple, inexpensive, and lightweight in structure and operation. Because of this, the majority of medium and heavy duty truck transmissions in common use today are manually operated.

More recently, however, in order to improve the convenience of use of manually operated transmissions, various structures have been proposed for partially or fully automating the shifting of an otherwise manually operated transmission, in either or both of the main and auxiliary sections. In a partially or fully automated manual transmission, some or all of the physical exertions mentioned above may be eliminated by providing an electronic control system for automatically determining when a shifting operation should occur and appropriate mechanical actuators for effecting such shifting. Although fully automated transmissions offer the advantages of increased convenience of use and reduced driver fatigue, manual transmissions provide the advantages of decreased cost, increased torque capacity, and better fuel economy. Thus, the majority of medium and heavy duty truck transmissions in common use today are manual transmissions.

Unfortunately, in manually shifted compound transmissions, it has been found that the driver of the vehicle can operate the thumb switch for the auxiliary section in such a manner as to cause premature wear and potential failure thereof. Specifically, if the auxiliary section of the compound transmission is attempted to be shifted when the vehicle speed is greater than a predetermined maximum limit, then damage can occur to some of the internal shifting components of the auxiliary section. Thus, it would be desirable to provide an improved method and apparatus for operating a compound transmission wherein a manually selected shift of the auxiliary section is automatically prevented from occurring unless the vehicle speed is within a predetermined maximum limit or range.

SUMMARY OF THE INVENTION

This invention relates to an improved method and apparatus for operating a compound transmission wherein a manually selected shift of the auxiliary section is automatically prevented from occurring unless the vehicle speed is within a predetermined maximum limit or range. A shift controller initially determines if a request for a shift operation in the auxiliary section has been made by the operator of the vehicle. This determination may be inferred from a change in the position of a manually operable switch. If a shift request has been made, the shift controller determines if the main section of the transmission is in the neutral gear ratio. If the main section of the transmission is not in the neutral gear ratio, then the shift controller takes no further action. When the shift controller determines that the main section of the transmission is in the neutral gear ratio, then it determines if the speed of the vehicle is within a predetermined limit or range to enable shifting of the auxiliary section in a safe and efficient manner. If the vehicle speed is not within the predetermined limit or range, then the shift controller takes no further action. If, however, the vehicle speed is within the predetermined limit or range, the shift controller activates a shift actuator to effect the desired shift within the auxiliary section of the transmission.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
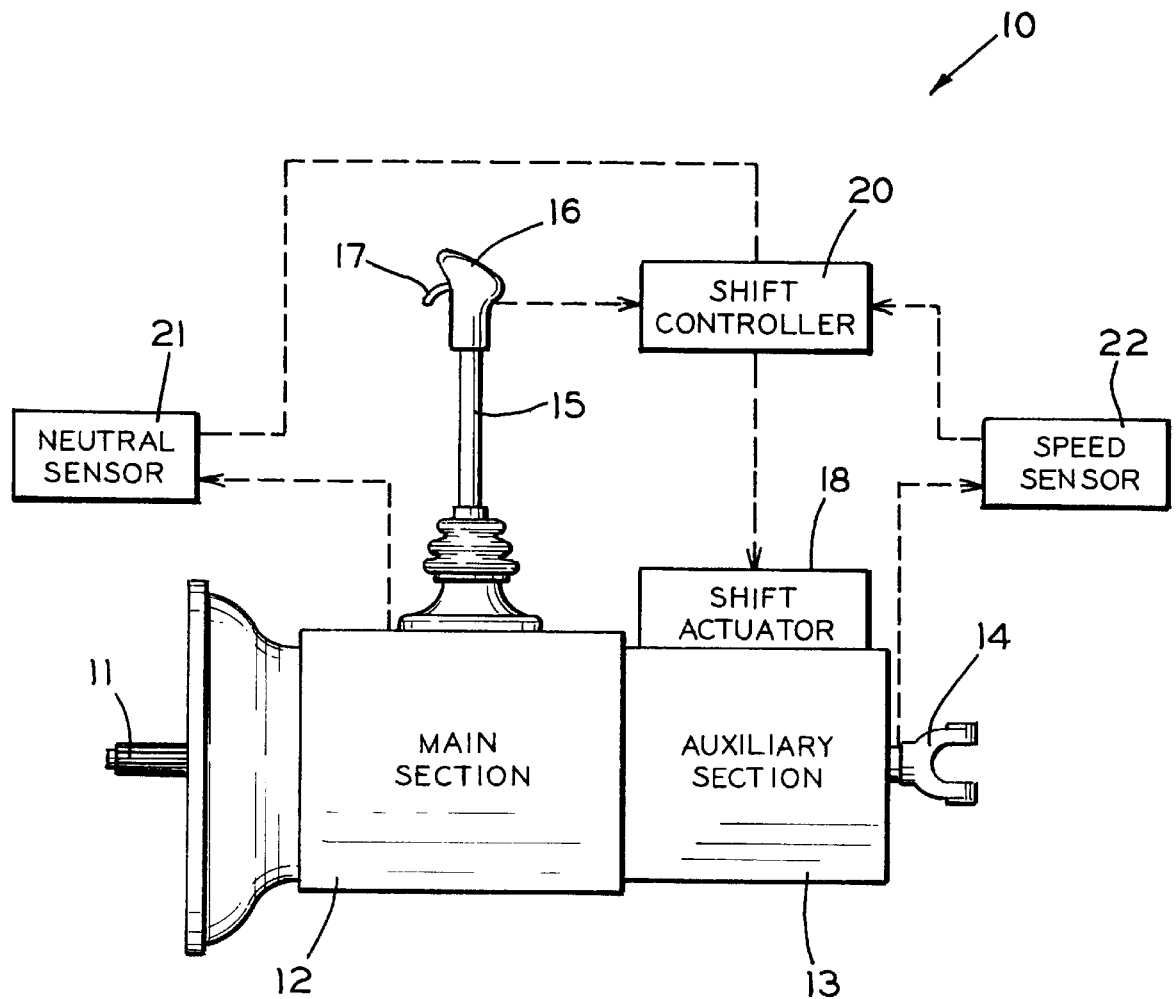
FIG. 1 is a side elevational view schematically illustrating a compound vehicle transmission in accordance with this invention.

Referring now to the drawings, there is illustrated in FIG. 1 a compound vehicle transmission, indicated generally at 10, in accordance with this invention. The compound transmission 10 includes an input shaft 11 that is adapted to be rotatably driven by a source of rotational power, such as a vehicle engine (not shown), a main section 12, an auxiliary section 13, and an output shaft or yoke 14 that is adapted to be connected to rotatably drive one or more wheels (not shown) of the vehicle. As is well known, the main section 12 provides a first plurality of gear ratios within the compound transmission 10, while the auxiliary section 13 provides a second plurality of gear ratios within the compound transmission 10. The internal structure of the compound transmission 10 is conventional in the art. The total number of gear ratios available from the compound transmission 10 as a whole is equal to the product of the number of gear ratios available from the main section 12 and the number of gear ratios available from the auxiliary section 13. Although this invention will be described in the context of a range type auxiliary section 13, it will be appreciated that this invention can be adapted for use in a splitter type auxiliary section 13.

A pivotable shift lever 15 is provided to effect shifting of the main section 12 of the compound transmission 10. The shift lever 15 is conventional in the art and includes an upper portion having a handle 16 mounted thereon that is adapted to be grasped and moved by a driver of the vehicle. In response thereto, a lower portion (not shown) of the shift lever 15 is moved within the main section 12 of the compound transmission 10 to select the desired gear ratio therein. To control the operation of the auxiliary section 13, a thumb switch 17 is provided on the handle 16 of the shift lever 15. The thumb switch 17 is intended to be representative of any type of switch or other structure that is manually operable by the driver when it is desired to select a gear ratio for the auxiliary section 13. Movement of the thumb switch 17 activates a shift actuator 18 to effect the desired shifting of the auxiliary section 13 in the manner described in detail below. For example, the thumb switch 17 may be moved to a first position relative to the handle 16 to effect a shift of the auxiliary section 13 from a low range to a high range. Similarly, the thumb switch 17 may be moved to a second position relative to the handle 16 to effect a shift of the auxiliary section 13 from a high range to a low range. The structure of the shift actuator 18 is also conventional in the art and may be embodied as a solenoid actuated pneumatic valve and piston arrangement, as is well known.

A shift controller 20 is connected between the thumb switch 17 and the shift actuator 18. The shift controller 20 can be embodied as any kind of electronic controller, such as a microprocessor or a programmable logic circuit. The range controller can be integrated with other system controllers located in the vehicle or its functions integrated with other controllers in a single processor for the whole vehicle. Preferably, however, the shift controller 20 is a microprocessor located within the handle 16 of the shift lever 15. In a manner described in detail below, the shift controller 20 is responsive to movement of the thumb switch 17 and other operating parameters of the transmission 10 to operate the shift actuator 18 to effect shifting of the auxiliary section 13. A neutral sensor 21 is provided for generating an electrical signal to the shift controller 20 whenever the main section 12 of the transmission 10 is in a neutral gear ratio, i.e., when the input shaft 11 is effectively disconnected from rotatably driving the output shaft 14. The structure of the neutral sensor 21 is conventional in the art. Frequently, the neutral sensor 21 is incorporated in a starter circuit (not shown) for the vehicle. Similarly, a speed sensor 22 is provided for generating an electrical signal to the shift controller 20 that is representative of the rotational speed of the output shaft 14 or other parameter that is representative of the speed of the vehicle. The structure of the speed sensor 22 is also conventional in the art.

Figure 2:
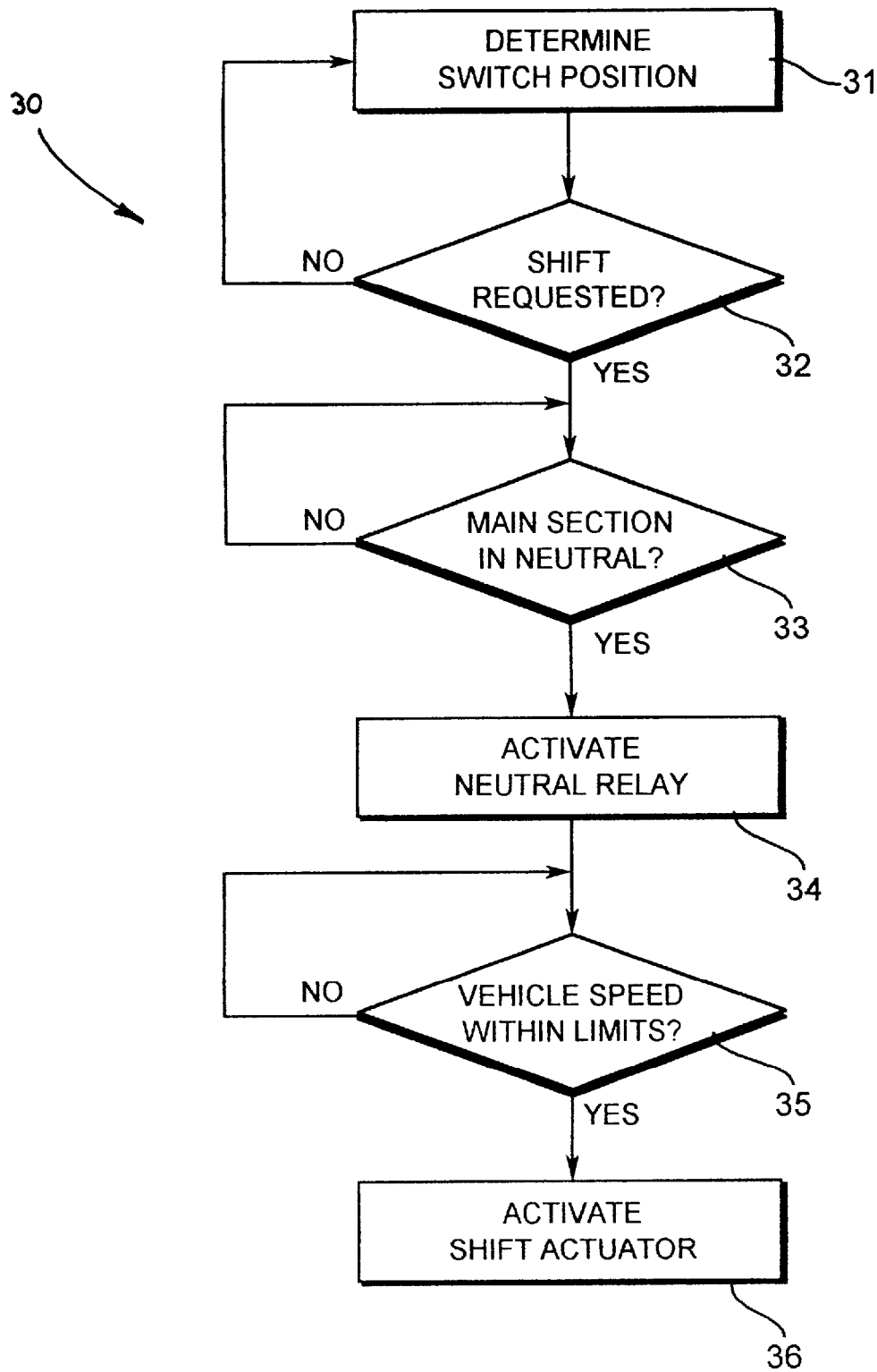
FIG. 2 is a flowchart illustrating an algorithm executed by the shift controller illustrated in FIG. 1 for controlling the operation of the shift actuator in accordance with this invention.

Referring now to FIG. 2, there is illustrated a flowchart showing an algorithm, indicated generally at 30, that can be executed by the shift controller 20 for controlling the operation of the shift actuator 18 to effect desired shifting of the auxiliary section 13 of the transmission 10. The algorithm 30 has an initial step 31 wherein the current position of the thumb switch 17 is determined. This determination may, for example, be made based upon the presence or absence of an electrical signal at the shift controller 20 from the thumb switch 17. Then, the algorithm 30 enters a decision point 32 wherein the shift controller 20 determines if a request for a shift operation in the auxiliary section 13 has been made by the operator of the vehicle. This determination may be inferred from a change in the position of the thumb switch 17. If no shift request has been made by the driver of the vehicle, the algorithm 30 branches back to the initial step 31 of determining the current position of the thumb switch 17. Thus, so long as the driver of the vehicle does not manually change the position of the thumb switch 17, the algorithm 30 will continuously loop between steps 31 and 32. If, however, a shift request has been made by the driver of the vehicle, the algorithm 30 enters a decision point 33 wherein the shift controller 20 determines if the main section 12 of the transmission 10 is in the neutral gear ratio. This determination may, for example, be made based upon the presence or absence of an electrical signal at the shift controller 20 from the neutral sensor 21. If the main section 12 of the transmission 10 is not in the neutral gear ratio, then the algorithm 30 branches back to the decision point 33. Thus, so long as the main section 12 of the transmission 10 is not in the neutral gear ratio, the algorithm 30 will continuously loop about step 33.

When the shift controller 20 determines that the main section 12 of the transmission 10 is in the neutral gear ratio, then the algorithm 30 branches from the decision point 33 to an instruction step 34, wherein a neutral relay of the starter circuit for the vehicle is activated. Then, the algorithm enters a decision point 35 wherein the shift controller 20 determines if the speed of the vehicle is within a predetermined limit or range to enable shifting of the auxiliary section 13 in a safe and efficient manner. This determination may, for example, be made based upon the magnitude or frequency of an electrical signal presented at the shift controller 20 from the speed sensor 22. The limit or range of speeds for acceptable shifting of the auxiliary section 13 can be determined in any conventional manner. For example, the predetermined limit or range can be pre-programmed into the shift controller 20 as a fixed value or set of values for comparison with the speed signal from the speed sensor 22. Alternatively, the shift controller 20 may generate the predetermined limit or range on an on-going basis in response to one or more operating conditions of the transmission 10 or the vehicle as a whole.

In any event, if the vehicle speed is not within the predetermined limit or range, the algorithm 30 branches back to the decision point 35. Thus, so long as the vehicle speed is not within the predetermined limit or range, the algorithm 30 will continuously loop about step 35. If, however, the vehicle speed is within the predetermined limit or range, the algorithm 30 enters a decision point 36 wherein the shift controller 20 generates a signal to the shift actuator 18 to effect the desired shift (either from low range to high range or from high range to low range) within the auxiliary section 13 of the transmission 10. It should be noted that the predetermined limit or range set for shifting the auxiliary section 13 from low range to high range may be different from the predetermined limit or range set for shifting the auxiliary section 13 from high range to low range.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A compound transmission for a vehicle comprising:
   a main section providing a first plurality of gear ratios and a neutral gear ratio;
   a manually shifted auxiliary section connected to said main section and providing a second plurality of gear ratios;
   a manually operable switch for generating a signal when it is desired to shift among said plurality of gear ratios provided by said auxiliary section;
   a first sensor for generating a signal when said main section is in said neutral gear ratio;
   a second sensor for generating a signal that is representative of the speed of the vehicle; and
   a controller responsive to said switch, said first sensor, and said second sensor for controlling the operation of said auxiliary section, said controller effecting a shift among said plurality of gear ratios provided by said auxiliary section when said signal is generated by said switch, said signal is generated by said first sensor, and said signal from said second sensor is within a predetermined range.

2. The compound transmission defined in claim 1 wherein the auxiliary section of the transmission is a range type auxiliary section.

3. The compound transmission defined in claim 1 wherein said main section includes a shift lever to effect shifting thereof.

4. The compound transmission defined in claim 3 wherein said manually operable switch is provided on said shift lever.

5. The compound transmission defined in claim 1 wherein said main section includes an input shaft and said auxiliary section includes an output shaft, and wherein said first sensor generates a signal when said input shaft is effectively disconnected from rotatably driving said output shaft.

6. The compound transmission defined in claim 1 wherein said main section includes an input shaft and said auxiliary section includes an output shaft, and wherein said second sensor generates a signal that is representative of the rotational speed of said output shaft.

7. A method of operating a compound transmission for a vehicle including a main section providing a first plurality of gear ratios and a neutral gear ratio and a manually shifted auxiliary section connected to the main section and providing a second plurality of gear ratios, said method comprising the steps of:
   (a) manually generating a first signal when it is desired to shift among the plurality of gear ratios provided by the auxiliary section;
   (b) generating a second signal when the main section is in the neutral gear ratio;
   (c) generating a third signal that is representative of the speed of the vehicle; and
   (d) effecting a shift among the plurality of gear ratios provided by the auxiliary section when the first signal is generated, the second signal is generated, and the third signal is within a predetermined range.

8. The method defined in claim 9 wherein said step (a) is performed by providing a manually operable switch and by manually operating the manually operable switch to generate the first signal when it is desired to shift among the plurality of gear ratios provided by the auxiliary section.

9. The method defined in claim 8 wherein said step (a) is further performed by providing a shift lever for to effect shifting of the main section and providing the manually operable switch on the shift lever.

10. The method defined in claim 7 wherein said step (b) is performed by generating the second signal when an input shaft of the main section is effectively disconnected from rotatably driving an output shaft of the auxiliary section.

11. The method defined in claim 7 wherein said step (c) is performed by generating a signal that is representative of the rotational speed of an output shaft of the auxiliary section.

* * * * *